No. 788,056. PATENTED APR. 25, 1905.
J. MATLOCK.
DRAFT EQUALIZER.
APPLICATION FILED AUG. 29, 1904.
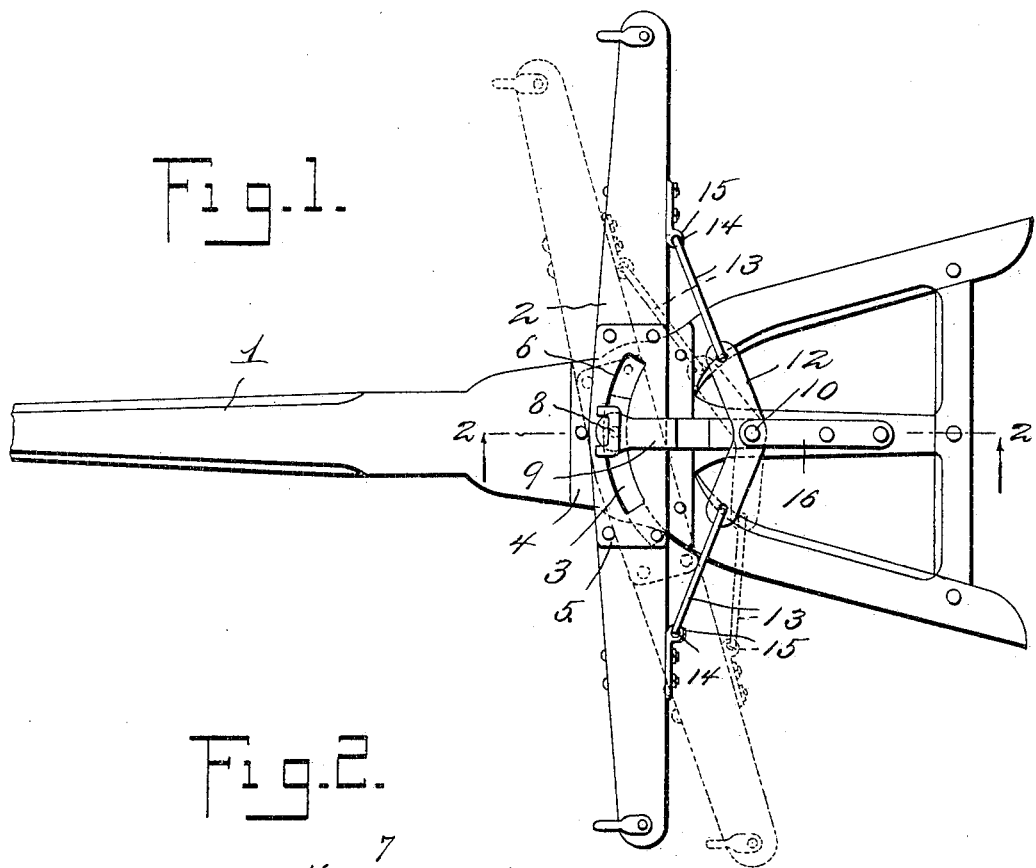
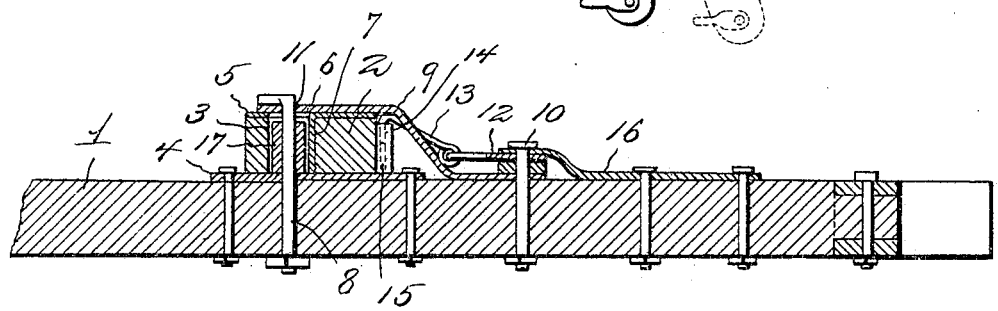
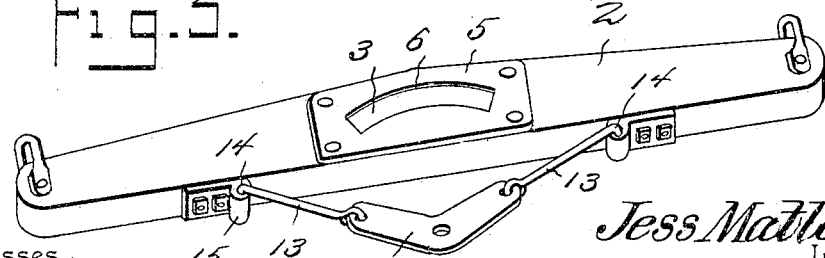
Witnesses
Jess Matlock,
Inventor.
by C. A. Snow & Co.
Attorneys No. 788,056. Patented April 25, 1905.

UNITED STATES PATENT OFFICE.

JESS MATLOCK, OF RALPH, ARKANSAS.

DRAFT-EQUALIZER.

SPECIFICATION forming part of Letters Patent No. 788,056, dated April 25, 1905.

Application filed August 29, 1904. Serial No. 222,635.

*To all whom it may concern:*

Be it known that I, JESS MATLOCK, a citizen of the United States, residing at Ralph, in the county of Marion and State of Arkansas, have invented a new and useful Draft-Equalizer, of which the following is a specification.

This invention relates to draft-equalizers, and has for its object to provide improved means of this character which may be conveniently applied to any ordinary tongue or pole and arranged to permit of the draft animal or animals at one side of the pole regaining their proper positions should they fall to the rear of the animals at the opposite side of the pole.

Another object of the invention is to secure this result through a swinging movement of the draw-bar and to provide a convenient mounting of the bar so as to obtain this result without altering or changing the tongue and the manner of connecting the draft-animals to the draw-bar.

With these and other objects in view the present invention consists in the construction and combination of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a plan view of a draft-equalizing apparatus embodying the features of the present invention. Fig. 2 is an enlarged detail sectional view on the line 2 2 of Fig. 1. Fig. 3 is a detail perspective view of the draw-bar and the brace therefor.

Like characters of reference designate corresponding parts in each and every figure of the drawings.

In explanation of the application and operation of the present invention there has been shown in the accompanying drawings a portion of an ordinary tongue or pole 1 with a draw-bar 2 extending transversely across the top thereof in the usual position. This bar is provided at its middle with an arcuate slot 3, extending longitudinally of the bar and intersecting the top and bottom thereof, there being a suitable wear-plate 4 applied to the top of the pole and upon which the draw-bar is mounted to slide and swing. Another wear-plate 5 is secured to the top of the draw-bar and is provided with an arcuate opening 6, registering with the arcuate slot, there being a pendent flange 7 at the rear edge of the opening to fit the rear wall of the arcuate slot in the draw-bar to take the wear thereof. A bolt or pin 8 pierces the tongue and projects upwardly through the slot 3, so as to guide the draw-bar in its movement, which is limited by the ends of the slot. In rear of the draw-bar there is a keeper 9, which has its rear end secured to the top of the tongue by a suitable fastening 10, with its forward end inclined upwardly so as to overlap the slotted portion of the draw-bar, and provided with a perforation 11 for the reception of the pin 8, whereby the latter is braced. An angular or bell-crank lever 12 is fulcrumed upon the fastening 10, and links 13 are loosely carried by the opposite ends of the lever, each link terminating at its forward free end in a hook 14 for detachable and pivotal engagement with an upstanding open-top keeper or socket 15, secured to the back of the draw-bar. A metallic brace-strap 16 is secured to the top of the tongue or pole with its forward end overlapping the lever 12 and pierced by the fastening 10, so as to brace the latter and also prevent undue looseness of the lever.

It will of course be understood that the draft-animals are secured to opposite ends of the draw-bar in any suitable manner, and by reason of the swinging movement of the draw-bar upon the pin 8 as a guide either of the animals may regain its proper position should they fall behind the animal at the opposite side of the pole. In this connection it will be noted that the lever 12 and the links 13 form braces to take some of the strain from the pin 8 without interfering with the free movement of the draw-bar, while the keeper 9 effectually braces the pin without interfering with the movements of the draw-bar, and the plates 4 and 5 and the flange 7 take up the wear occasioned by the movements of the draw-bar.

A suitable antifriction-roller 17 is mounted upon the pin 8, so as to rotate upon contact with either of the walls of the slot 3, and thereby prevent binding of the draw-bar upon the pin, as well as to reduce wear upon the walls of the slot.

Having thus fully described the invention, what is claimed is—

1. In a draft-equalizer, the combination with a support having an upstanding pin, of a draw-bar having a longitudinally-disposed arcuate slot receiving the pin with the bar capable of slidable movements upon the pin, and braces pivoted at a common point to the support in rear of the draw-bar in alinement with the pin and also loosely connected to the draw-bar.

2. In a draft-equalizer, the combination with a support having a pin, of a draw-bar having a longitudinally-disposed arcuate slot receiving the pin with the draw-bar capable of endwise and pivotal movements upon the pin, a bell-crank lever fulcrumed upon the support in rear of the draw-bar and in alinement with the pin, and links loosely connected to the respective ends of the lever and also loosely connected to the draw-bar.

3. In a draft-equalizer, the combination with a support having a pin, of a draw-bar having a longitudinally-disposed arcuate slot receiving the pin with the bar capable of endwise and pivotal movements upon the pin, sockets carried by the back of the draw-bar beyond the ends of the slot, a bell-crank lever fulcrumed upon the support in rear of the draw-bar in longitudinal alinement with the pin, links loosely connected to the respective ends of the lever with their outer ends provided with hooks loosely engaged with the respective sockets.

4. In a draft-equalizer, the combination with a support having a pin, of a draw-bar having a longitudinally-disposed arcuate slot receiving the pin and said bar capable of endwise and pivotal movements upon the pin, a keeper secured to the support in rear of the draw-bar with its forward end overlapping the slotted portion of the bar and engaging the pin to brace the same, and braces pivoted at a common point upon the support in rear of the draw-bar and loosely connected to said draw-bar at opposite sides of the keeper.

5. In a draft-equalizer, the combination with a support having a pin, of a draw-bar having a longitudinally-disposed arcuate slot with the draw-bar capable of pivotal and endwise movements upon the pin, a keeper secured to the support in rear of the draw-bar with its forward end overlapping said bar and connected to the pin, a bell-crank lever fulcrumed upon the keeper in rear of the draw-bar, links loosely connected to the respective ends of the lever and terminating at their outer ends in hooks, sockets carried by the back of the draw-bar for the loose reception of the hooks, and a brace secured to the support and engaged with the fulcrum of the lever.

In testimony that I claim the foregoing as my own I have hereto affixed my signature in the presence of two witnesses.

JESS MATLOCK.

Witnesses:
W. N. MATLOCK,
L. MATLOCK.